United States Patent [19]

Gallagher

[11] 4,283,084
[45] Aug. 11, 1981

[54] MOTORCYCLE COVER

[75] Inventor: Donald A. Gallagher, Ventura, Calif.

[73] Assignee: Westworld Enterprises, Ventura, Calif.

[21] Appl. No.: 968,821

[22] Filed: Dec. 12, 1978

[51] Int. Cl.³ .............................................. B62J 19/00
[52] U.S. Cl. .................................................. 296/78.1
[58] Field of Search .................... 296/136, 78.1, 95 R, 296/78 R, 81, 82, 83, 95 Q, 95 C; 280/289

[56] References Cited

U.S. PATENT DOCUMENTS

| | | | |
|---|---|---|---|
| 3,537,746 | 11/1970 | Peters | 296/78.1 |
| 3,659,872 | 5/1972 | Warner | 296/78.1 X |
| 3,884,523 | 5/1975 | Allen | 296/136 |
| 4,013,315 | 3/1977 | West | 296/83 |

FOREIGN PATENT DOCUMENTS

| | | | |
|---|---|---|---|
| 179997 | 3/1954 | Austria | 296/78.1 |
| 580509 | 8/1958 | Italy | 296/78.1 |
| 614884 | 1/1961 | Italy | 296/78.1 |
| 159135 | 3/1933 | Switzerland | 296/78.1 |
| 324376 | 10/1957 | Switzerland | 296/78.1 |

*Primary Examiner*—John J. Love
*Assistant Examiner*—Norman L. Stack
*Attorney, Agent, or Firm*—Kenneth J. Hovet

[57] ABSTRACT

A lightweight covering for a motorcycle that can be folded into a compact handsize package when not in use. The covering extends from the back of a motorcycle seat to the front of the tank and covers both sides of the engine. Side loops are provided for securing the cover to corresponding motorcycle foot posts and opposing front corners are adapted to overlap in front of the engine and releasably attach to each other.

7 Claims, 9 Drawing Figures

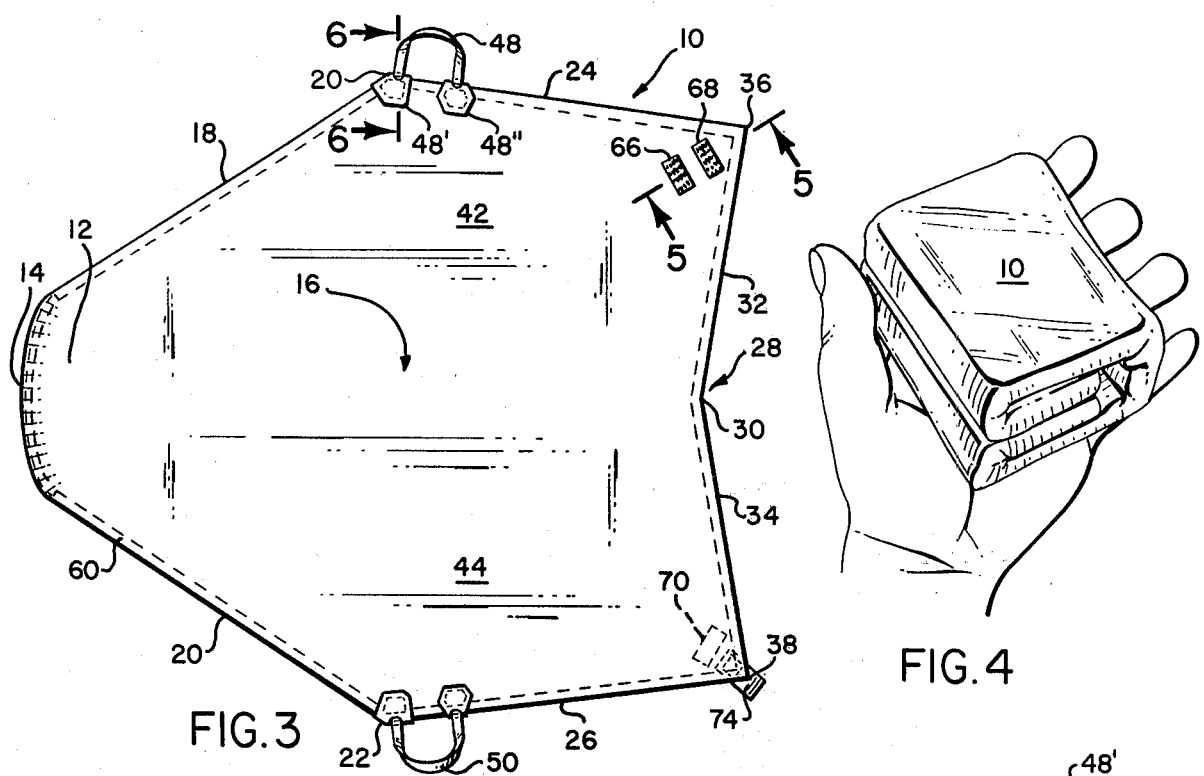
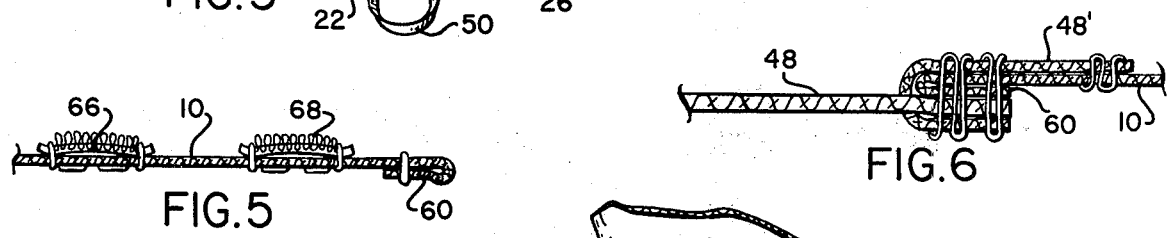
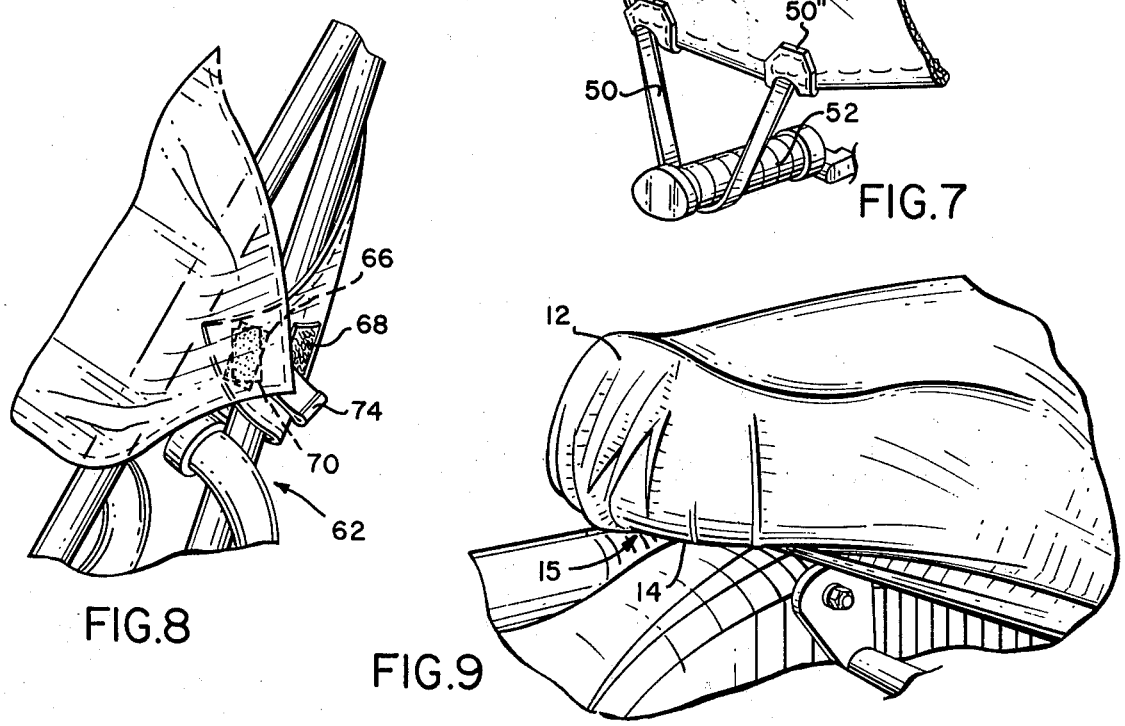

MOTORCYCLE COVER

BACKGROUND OF THE INVENTION

1. Field of the Invention

The present invention relates to protective covers and, more particularly, to a lightweight protective covering for a motorcycle.

2. Description of the Prior Art

Typical of coverings known in the art are those in which the entire motorcycle is draped with a canvas, sheet of plastic or the like. Such coverings adequately hang over the cycle due to their own inherent weight or they frequently utilize grommets and drawstrings for securing the covering on the cycle. Handling and storage of such coverings are commonly difficult because of their bulk and unwieldiness. Such bulk is especially a problem with the limited space available on a motorcycle.

An attempt to overcome the above difficulties is manifested in U.S. Pat. No. 3,884,523 wherein a protective covering is permanently attached and stored within the motorcycle seat. The covering encompasses the entire motorcycle. Although theoretically a good solution, the problem arises when one attempts to repack the covering into the seat. Due to the limited space, one must painstakingly fold and lap the covering in a precise manner in order not to exceed the available space. Also, because of the permanent attachment to the seat, rain, snow, dust and debris will be funnelled into the seat storage space. This, of course, is a particularly obnoxious disadvantage.

Another system shown in U.S. Pat. No. 3,537,746 utilizes a spring-biased roller upon which a protective shield is stored. The roller allows the shield to be extended and retracted into a chamber adjacent a motorcycle seat. This system also suffers the disadvantage of being permanently attached to the motorcycle whereby its retraction causes the movement and accumulation of unwanted elements into the storage chamber. Additionally, upon spring failure, one would not at all be able to properly handle the shield.

SUMMARY OF THE INVENTION

A particular advantage of the present invention resides in its ability to be completely removed from the motorcycle and folded into a small package having a size comparable to one's hand. In this manner, the cover may be shaken clean, washed, repaired, used for other purposes, stored and transported without any difficulty.

The cover is symmetrical and generally pentagonal-shaped having two converging side edges defining an acute angle. In place of the apice of the acute angle is a round shape somewhat coextensive with the curvature of the rear of a motorcycle seat. The overall length of the cover extends from the rear portion of the motorcycle seat to the front portion of the gas tank. The overall width covers both sides of the motorcycle and includes opposing front corners sufficiently sized to overlap and interconnect about the lower front of the motorcycle frame.

BRIEF DESCRIPTION OF THE DRAWINGS

FIG. 3 is a top plan view of the invention.

FIG. 4 is an illustration depicting the protective covering folded into a compact package.

FIG. 5 is an enlarged cross-section taken along lines 5—5 of FIG. 3.

FIG. 6 is an enlarged cross-section taken along lines 6—6 of FIG. 3.

FIG. 7 is an enlarged fragmentary view taken at line 7 of FIG. 2.

FIG. 8 is an enlarged fragmentary view taken along line 8 of FIG. 2.

FIG. 9 is an enlarged fragmentary view taken along line 9 of FIG. 2.

DESCRIPTION OF PREFERRED EMBODIMENTS

Figure 1:
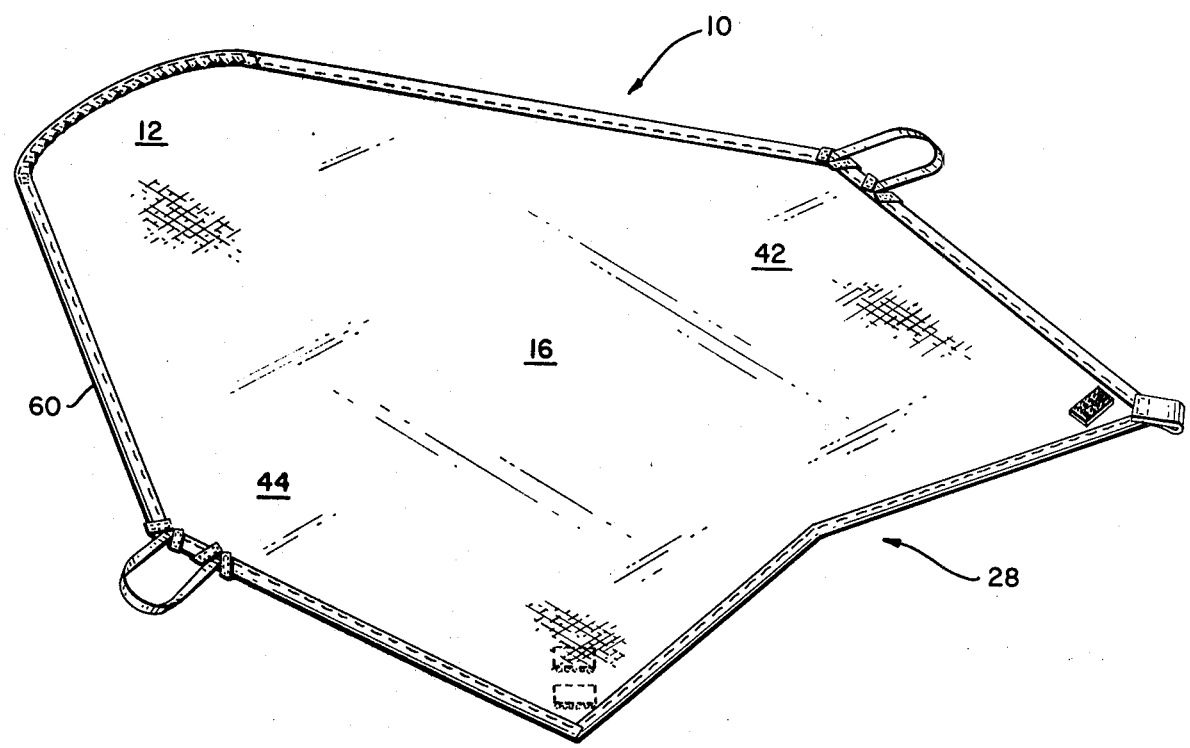
FIG. 1 is a perspective bottom plan view of the protective covering of the present invention.

Referring now to the drawings, it will be noted that reference numeral 10 refers generally to the protective covering of the present invention. The overall shape of the covering may generally be described as pentagonal in shape. It includes an end portion 12 having a curved-end edge 14 adapted to correspond to the curvature of the rear portion 15 of the motorcycle seat.

Extending from the end portion 12 is central portion 16. The central portion is generally defined by converging edges 18,20 which merge at lateral midpoints 20 and 22 into opposing lateral edges 24,26. The central portion terminates at a front edge shown generally by reference numeral 28. In the preferred embodiment, the front edge is provided with indented midpoint 30 from which diverging edges 32,34 extend outwardly to opposing corners 36,38.

Figure 2:
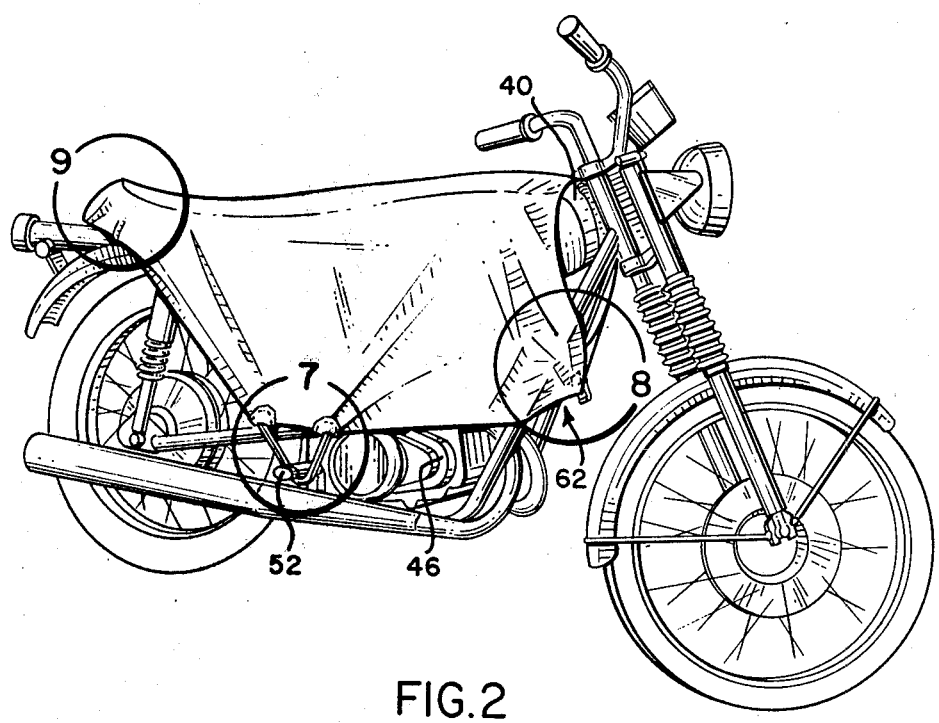
FIG. 2 is an illustration depicting use of the invention on a motorcycle.

The overall length of the protective covering corresponds to the distance from the lower back portion of the motorcycle seat to the front portion of the motorcycle gas tank, shown in FIG. 2 by reference numeral 40. The covering includes opposing lateral portions 42,44 which extend a distance from the central portion down a distance sufficient to cover the lower region of the motorcycle engine shown by reference numeral 46. The purpose is, of course, to protect the engine from adverse weather and other elements.

To secure the protective covering to the motorcycle, the curved-end edge 14 is preferably provided with an elastic means such as an elastic band (not shown) extending along the edge. The band may simply be located within the peripheral hem 60 of the covering. The lateral midpoints 20,22 are provided with engagement means 48 and 50. The engagement means are preferably closed-end loops of an elastic band material adapted to engage the outwardly extending foot posts 52 of a motorcycle. Other means known in the art such as an elongated strip of material, cord, hook, swivel chain or the like, may be utilized in place of the elastic band. In the case of a hook means, it will be understood that such may be connected to some structure other than the foot post 52 shown in preferred embodiment.

The elastic bands 48 and 50 are preferably stitched to the edge of the covering with each stitched-in portion overlayed with reinforcing patches shown by reference numerals 48', 48" and 50', 50", respectively. As best shown in FIG. 6, the reinforcing patches extend over the top and bottom of the protective covering 10 which itself includes the aforementioned hem 60 extending about the periphery of the covering. It will be understood that if other equivalent engagement means are used, such will be secured to the covering in a similar reinforced manner.

Corners 36 and 38 are each provided with retention means adapted for connecting the corners together across the lower front frame 62 of the motorcycle. Preferably, the corners substantially overlap each other in a manner to maximize protection of the motorcycle engine. As shown particularly in FIGS. 3 and 8, corner 36 includes connector elements 66,68 which are upwardly extending fabric connectors of the type sold under the trademark Velcro. Corner 38 includes connector element 70 which includes the corresponding Velcro fastening element. When arranged in an overlapping arrangement as shown in FIG. 8, the downwardly facing fastener 70 engages corresponding fastener 66. Of course, depending on the frame structure of a particular motorcycle, fastener 70 may engage corresponding fastener 68 thereby providing for adjustability in the protective covering. To facilitate engagement of the connector elements, tab 74 is provided at corner 38. This tab facilitates the manual grasping of corner 38 for rapid removal of the covering from the motorcycle.

As shown in FIG. 5, the connecting elements are readily stitched as patches to the corner areas of the covering 10. It will also be appreciated that other means well known in the art may be substituted for the cloth fastening means hereinabove described. Such equivalent means could be snap-fastening means, buttons, various types of clips, clasps, belt means, straps, and the like.

A particular advantage of the present invention is the fact that it is made of a lightweight flexible material such as ripstop nylon, polyester fabrics and other materials which resist the effects of weather. It is important that the material be thin and pliable so that it can be readily folded into a package corresponding in size to one's hand as shown in FIG. 4.

It will be appreciated that no attempt has been made to cover the entire motorcycle. Rather, the parts which are most desirably sheltered from the elements, namely the seat and the engine areas are protected. In this manner, a covering having less material can be constructed. Additionally, the covering of the invention is provided with the above-described attachment means which are simple to use, rust proof and adapted to be securely engaged to the motorcycle in a manner that the covering cannot be readily blown away. In this manner, less bulk is required while covering the critical features of a motorcycle. Also, one can readily foresee the advantage of having a covering that can be folded into a size and shape that will form a package commensurate in size to the palm of one's hand. It is within the scope of the present invention to further provide an outer bag or container for the folded covering 10 such that the entire package may be placed in one's pocket. It is important to appreciate, however, that the protective covering is not permanently attached to the motorcycle and can be entirely removed and carried away from the motorcycle itself.

While the invention has been described with respect to preferred embodiments, it will be apparent to those skilled in the art that other modifications and improvements may be made without departing from the scope and spirit of the invention. Accordingly, it is to be understood that the invention is not to be limited by the aforementioned specific embodiments but only by the scope of the appended claims.

I claim:

1. A portable protective covering for a motorcycle having a seat located higher than the motorcycle engine and a front frame located forward thereof comprising a foldable sheet having a first end portion generally defined by coverging edges each of which merge into a curved-end edge corresponding to the curvature of the back end of said motorcycle seat and adapted to interfit said seat and thereby become frictionally engaged therewith, said first end portion extending into a central portion and an opposing second end portion terminating at a front edge having opposing corners that include corresponding attachment means for releasably connecting said corners to each other across said front framework, said central portion including opposing lateral portions adapted to cover each side of a motorcycle with each lateral portion terminating in a lateral edge having engagement means for releasable connection to a corresponding motorcycle part.

2. The covering of claim 1 wherein said sheet comprises a flexible weather resistant material which can be manually folded into a compact hand-size packet.

3. The covering of claim 1 wherein said curved-end edge includes elastic means for frictionally engaging the first end portion to said seat.

4. The covering of claim 1 wherein said sheet is symmetrical and generally pentagonal in shape defined by obtuse angles except for the angle defined by said converging edges.

5. The covering of claim 1 wherein said corners overlap across the lower front of said framework and said attachment means comprise corresponding connector elements mounted at each corner adapted for releasable attachment therebetween.

6. The covering of claim 1 wherein said front edge comprises two edges diverging from an indented midpoint to each of said corners.

7. The covering of claim 5 wherein said engagement means comprise a closed-loop elastic band adapted for engagement with a motorcycle foot post.

* * * * *